United States Patent
Brennan et al.

(10) Patent No.: US 6,969,527 B2
(45) Date of Patent: *Nov. 29, 2005

(54) CALCIUM HYPOCHLORITE BLENDED TABLETS

(75) Inventors: James P. Brennan, Oolpewah, TN (US); Paul S. Loomis, Lawrenceville, GA (US)

(73) Assignee: Arch Chemicals, Inc., Norwalk, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 10/783,210

(22) Filed: Feb. 20, 2004

(65) Prior Publication Data

US 2004/0214738 A1 Oct. 28, 2004

Related U.S. Application Data

(63) Continuation-in-part of application No. 10/405,388, filed on Apr. 2, 2003.

(51) Int. Cl.[7] .................................................. A61K 9/20
(52) U.S. Cl. ....................................... 424/464; 424/465
(58) Field of Search ................................. 424/464, 465, 424/405, 408, 602, 697

(56) References Cited

U.S. PATENT DOCUMENTS

| | | | |
|---|---|---|---|
| 3,793,216 A | 2/1974 | Dychdala et al. | 252/187 H |
| 4,145,306 A | 3/1979 | Tatara et al. | 252/187 H |
| 4,192,763 A | 3/1980 | Buchan | 252/187 H |
| 4,201,756 A | 5/1980 | Saeman et al. | 423/266 |
| 4,692,335 A | 9/1987 | Iwanski | 424/149 |
| 4,865,760 A | 9/1989 | Johnson et al. | 252/187.28 |
| 4,876,003 A | 10/1989 | Casberg | 210/169 |
| 4,928,813 A | 5/1990 | Casberg | 206/0.5 |
| 4,961,872 A | 10/1990 | Sinclair | 252/186.37 |
| 4,970,020 A | 11/1990 | Johnson et al. | 252/187.28 |
| 5,009,806 A | 4/1991 | Johnson et al. | 252/187.28 |
| 5,164,109 A | 11/1992 | Wojtowicz | 252/175 |
| 5,205,961 A | 4/1993 | Shenefiel et al. | 252/186.37 |
| 5,753,602 A | 5/1998 | Hung et al. | 510/192 |

*Primary Examiner*—James M. Spear
(74) *Attorney, Agent, or Firm*—William A. Simons; Wiggin and Dana LLP

(57) ABSTRACT

A non-Division 5.1 Oxidizer tablet consisting essentially of a blend of hydrated calcium hypochlorite with magnesium sulfate heptahydrate, wherein the blend contains at least about 17% by weight of water based on the total weight of the blend; contains from about 0.1% to about 10% of lime based on the total weight of the hydrated calcium hypochlorate and magnesium sulfate heptahydrate and the average dissolving rate of the tablet is less than 150 grams per day.

14 Claims, No Drawings

CALCIUM HYPOCHLORITE BLENDED TABLETS

CROSS REFERENCE TO RELATED APPLICATION

This application is a continuation-in-part of U.S. patent application Ser. No. 10/405,388 entitled "CALCIUM HYPOCHLORITE BLENDED TABLETS" filed on Apr. 2, 2003. That parent application is incorporated herein by reference in its entirety.

BACKGROUND OF THE INVENTION

1. Field of the Invention

The present invention relates to tablets having diminished fire producing properties and is a slow dissolving product containing selected mixtures of hydrated calcium hypochlorite with magnesium sulfate heptahydrate.

2. Brief Description of Art

Hydrated calcium hypochlorite is a strong oxidizer and as such can cause a severe increase in the burning rate of combustible material with which it comes in contact. This oxidation characteristic can cause problems both in the transport and storage of the product. For example, fires involving calcium hypochlorite can be quite vigorous, particularly when combustible material is present, including the product's packaging material itself (e.g., plastic, cardboard). The blends of hydrated calcium hypochlorite and magnesium sulfate heptahydrate of the invention are not classified as a "Division 5.1 Oxidizer" (i.e. they do not increase the burning rate of combustible material) as measured by an internationally recognized test standard, i.e., the United Nations Protocol: Transport of Dangerous Goods: Manual of Tests and Criteria, Section 34; Classification Procedures, Test Methods, and Criteria relating to Oxidizing Substances of Division 5.1.

Products that are "Division 5.1 Oxidizers" are by definition "dangerous goods" for purposes of transport. The following references have discussed this fire-causing problem and offered solutions to it.

U.S. Pat. No. 3,793,216 (Feb. 19, 1974) (assigned to Pennwalt) teaches adding water in the form of a hydrated inorganic salt to anhydrous calcium hypochlorite (less than 1% water) so that the total resulting water in the blend was from 3 to 13% resulting in a product that "provides resistance to exothermic, self-propagating decomposition when contacted by flame, spark, or a contaminating organic substance". The test used in this patent to verify this property was an "ignition test", which contacts the test sample (from 10 to 500 grams) with a lit match, or a drop of glycerin or 2-propanol. Ignition and self-propagation of burning are indicators of failure. Blends that have a delayed reaction, a less vigorous reaction, or a localized reaction compared to anhydrous calcium hypochlorite were considered to be successful blends. However, this "ignition test" is not a demanding test. Since no fuel is present the procedure does not test the oxidizing properties, i.e., they could still increase the burning rate of combustible materials. In fact, as will be shown below, many blend products described by this Pennwalt patent pass this ignition test but would still be classified as "Division 5.1 Oxidizers".

U.S. Pat. No. 4,201,756 (May 6, 1980), (assigned to Olin) teaches the coating of calcium hypochlorite with a plurality of layers of inorganic salts. The first layer must be comprised of salts of Periodic Table Group I alkali metal salts (sodium, potassium, lithium, rubidium, cesium or francium.) The salt must be a chloride, chlorate, nitrate, bromide, bromate, or sulfate. The first layer forms a barrier so that incompatible salts such as basic aluminum sulfate, alkalized magnesium sulfate, and sodium borates may be coated with a second layer on the pre-coated calcium hypochlorite without physical contact with the calcium hypochlorite. See column 17, lines 36 to 54. The layers of salt form a physical barrier, which resists dusting and degradation during handling, and also decreases propensity for ignition and self-sustained decomposition when contacted by a lighted match or incompatible organic materials.

There are many differences between this Olin patent and the present invention. First, the requirement that an inert alkaline salt (such as sodium chloride) be added as a barrier between calcium hypochlorite and a material such as magnesium sulfate heptahydrate is not necessary. Second, the requirement that the final water content of the coated calcium hypochlorite be between 0.5 and 10% is actually counter-productive for reducing the oxidizing behavior of calcium hypochlorite. As such, the mechanism is different from that disclosed in this invention, which involves physically mixing the two substances so that they are in physical contact with each other, and maintaining a water content of at least 17%.

The best indicator of the difference between the two ideas is shown using Example XIV in the Olin patent. The example shows that calcium hypochlorite encapsulated with sodium chloride (approximately 21% by weight) prevented ignition of the material when contacted with a lighted match, i.e., it failed to undergo self-sustained decomposition. Our experiments show that physically blending 21% sodium chloride with calcium hypochlorite actually accelerates burning. As stated above, the mechanism is therefore different.

In addition, calcium hypochlorite tablets have demonstrated very fast dissolving rates in water. For example, as shown in U.S. Pat. Nos. 4,876,003 and 4,928,813 (both issued to Casburg and were assigned to Olin), plastic sleeves were positioned around the tablet to slow down the dissolving rate of calcium hypochlorite tablets. When placed around the tablets, the tablets last longer, thus providing convenience in chlorinating swimming pools and other applications. However, such plastic sleeves after use, must be removed from the skimmers, feeders and floaters for the swimming pools where they were used. This removal and discarding can be inconvenient to the pool owner. Alternatively, finely divided polyfluorinated polymer has been added to calcium hypochlorite tablets to cause the tablets to dissolve slower. See U.S. Pat. Nos. 4,970,020 and 5,205,961. Other chemical blends for making calcium hypochlorite tablets are disclosed in U.S. Pat. Nos. 4,145, 306; 4,192,763; 4,692,335; 4,865,760; 4,961,872; 5,009, 806; 5,164,109; and 5,753,602.

There is still a need in this art to produce blended calcium hypochlorite tabletted products that are (1) relatively slow dissolving product that does not require the use of a plastic sleeve or insoluble material and (2) is not classified as a Division 5.1 Oxidizer and which has enhanced safety. (i.e., diminished fire-producing properties). The present invention provides a solution to that need.

BRIEF SUMMARY OF THE INVENTION

Therefore, one aspect of the present invention is directed to a non-Division 5.1 Oxidizer tablet consisting essentially of a blend of hydrated calcium hypochlorite and magnesium sulfate heptahydrate, wherein the water content of the blend is at least about 17% by weight of the blend; contains from about 0.1% to about 10% of lime based on the total weight of the hydrated calcium hypochlorite and magnesium sulfate heptahydrate and the average dissolving rate of the tablet is less than 150 grams per day.

The tablet of the present invention is not a Division 5.1 Oxidizer and will produce fires of dramatically diminished intensity compared to the above-noted prior art calcium hypochlorite-containing blends. Because the products of the present invention are not classified as Division 5.1 Oxidizers, they are not considered dangerous goods for purposes of transport and thus their transportation costs are lower than the above-noted prior art blends.

Also due to the dramatically reduced intensity of any fire involving these tablets (compared to currently marketed calcium hypochlorite dihydrate tabletted products) the public good is served by the greatly enhanced safety in the storage and transportation of the product.

DETAILED DESCRIPTION OF THE INVENTION

The term "non-Division 5.1 Oxidizer composition" as used in the present specification and claims refers to any blend of calcium hypochlorite hydrate and magnesium sulfate heptahydrate that is not classified as a UN Division 5.1 Oxidizer according to standard testing procedures now in effect.

The term "tablet" is used in the present specification and claims to cover any shape or size tablet, or other compressed shaped product made of a blend of the two critical materials. Such tablets do not cover loose granular materials such as covered by copending U.S. patent application Ser. No. 10/271,375 filed on Oct. 15, 2002. Such tablets may be made according to any conventional tablet-making process and/or any conventional equipment that is used for making pool sanitizer tablets.

The term "blend" is used in the present specification and claims refer to any homogeneous or near homogeneous mixture of the two critical materials. It does not include encapsulated or layered products such as covered in U.S. Pat. No. 4,201,756.

The term "hydrated" as used in conjunction with calcium hypochlorite products in the present specification and claims refers to any calcium hypochlorite product that has a water content of at least 5% by weight of calcium hypochlorite product. Preferably, the compositions of the present invention consist of commercial "hydrated" (5.5% to 16% water) calcium hypochlorite, CAS number [7778-54-3] and magnesium sulfate heptahydrate, CAS number [10034-99-8]. These preferred blends do not accelerate burning and are therefore non-oxidizers (as measured by the industry standard oxidizer classification test, i.e., United Nations Protocol Transport of Dangerous Goods—Oxidizing Substances of Division 5.1).

The term "average dissolving rate" as used in the present invention, unless otherwise identified, is used to mean the static average dissolving rate of the tabletted blends of the present invention in a standing volume of water.

As stated above, the tablets of the present invention have an average dissolving rate of less than about 150 grams/day. In other words, a 300 gram tablet will take at least 2 days to dissolve completely in a standing (non-flowing) body of water. Preferably, the average dissolving rate is less than 100 grams per day for the tablets of the present invention. It should be recognized that the average dissolving rate of the tabletted blends of the present invention will generally have higher dissolving rates in flowing water conditions such as in a skimmer or a feeder in a swimming pool.

The composition preferably contains at least about 25% by weight of magnesium sulfate heptahydrate and less than about 75% by weight of hydrated calcium hypochlorite. More preferably, these compositions contain from about 25% to about 40% magnesium sulfate heptahydrate and about 60% to about 75% by weight of hydrated calcium hypochlorite.

Also, the amount of water in the blend should be at least about 17% by weight of the total blend; more preferably, about 18% to about 24% by weight of the blend. The granular magnesium sulfate heptahydrate is physically blended with granular calcium hypochlorite to produce an essentially homogeneous granular mixture. As stated above, the blends are not classified as UN Division 5.1 oxidizers.

The tabletted composition of the present invention may also contain small amounts of other materials as long as the presence of those materials does not cause the resulting product to be classified as a Division 5.1 Oxidizer.

One preferred material is lime ($Ca(OH)_2$) which may be included in amounts up to about 10% by weight; preferably, from about 0.1% to about 10% by weight; more preferably about 0.5% to about 3%; and most preferably, about 1% to about 2%, of the total amount of the blend of the two critical ingredients. It is believed that these blended tablets are more stable with the inclusion of lime, resulting in a long shelf life of the tablets. Also, from an operational standpoint, the inclusion of lime into the blend appears to extend the chlorine delivery time of the tablet in the aqueous environment.

The amount of water in the tabletted product may be calculated by any standard analytical method for measuring water in chemical products like these. Our preferred method is thermogravimetric analysis (TGA).

The tabletted products of the present invention may be made from granular blends of the two critical ingredients (with or without optional additives such as lime) according to any conventional tabletting process and equipment normally used for making calcium hypochlorite hydrate-containing tablets. Any suitable equipment that produces molded compacted products such as tablets, caplets or briquettes, or other known molded compacted products, using the blends of the present invention may be used. Any shape or size tablet may be used. One preferred form of tablet is shown in U.S. Pat. No. 4,876,003. The preferred size tablet of that cylindrical shape is about 4 inches in length and about 1.8 inch in diameter. Preferred tabletting equipment includes hydraulic presses (such as Hydratron or Hydramet or Bipel hydraulic presses). Any suitable dwell times and pressures may be used in operating such hydraulic presses. Specifically, these tablets are useful as water treatment sanitizers (e.g. in swimming pools and spas), and are especially safer to transport and store than calcium hypochlorite itself.

While not a preferred embodiment, it may be useful for some applications to place a plastic sleeve over the tabletted blends of the present invention to obtain a tabletted product that has even longer dissolving times.

The present invention is further described in detail by means of the following Examples and Comparisons. All parts and percentages are by weight and all temperatures are degrees Celsius unless explicitly stated otherwise.

EXAMPLES

The test for oxidizing substances described in Section 34 of the United Nations Protocol was used to determine the characteristics of the various blends listed in the table below. This test is much more demanding than the glycerin "ignition" test (described earlier), requiring the presence of a substantial amount, i.e., up to 50% by weight, of a fuel (cellulose) rather than one drop of potential fuel. The detailed test method is described in the United Nations Recommendations on the Transport of Dangerous Goods; Manual of Tests and Criteria; Third Revised Edition; Section 34 "Classification Procedures, Test Methods and Criteria Relating to Oxidizing Substances of Division 5.1. In the test, the relative burning rates of the various calcium hypochlorite products are compared to those of other known oxidizers. On the basis of this test, a product can be defined as an oxidizer or a non-oxidizer. The test method states that "This test method is designed to measure the potential for a solid substance to increase the burning rate or burning intensity of a combustible substance when the two are thoroughly mixed. Tests are conducted on the substance to be evaluated mixed with dry fibrous cellulose in mixing ratios of 1:1 and 4:1, by mass, of sample to cellulose. The burning characteristics of the mixtures are compared with the standard 3:7 mixture, by mass, of potassium bromate to cellulose. If the burning time is equal to or less than this standard mixture, the burning times should be compared with those from packing group I or II reference standards, 3:2 and 2:3, by mass of potassium bromate to cellulose respectively."

By definition, a substance that is not Division 5.1 Oxidizer (i.e., not an oxidizing substance) is any substance which, in both the 4:1 and 1:1 sample-to-cellulose ratio (by mass) tested, does not ignite and burn, or exhibits mean burning times greater than that of a 3:7 mixture (by mass) of potassium bromate and cellulose.

The following blends of both hydrated and anhydrous calcium hypochlorite with other materials were evaluated using the test method discussed above.

TABLE 1

Testing results of various calcium hypochlorite (anhydrous and hydrated) blends using the UN Division 5.1 oxidizer classification test.

| Example | Blend Components | Ratio | % H$_2$O in blend | 5.1 Oxidizer |
|---|---|---|---|---|
| Blends with "anhydrous" Ca(OCl)$_2$ | | | | |
| 1 | Ca(OCl)$_2$/CaSO$_4$.2H$_2$O | 80/20 | 5.0 | Yes |
| 2 | Ca(OCl)$_2$/Na$_2$B$_4$O$_7$.5H$_2$O | 80/20 | 7.0 | Yes |
| 3 | Ca(OCl)$_2$/Na$_3$PO$_4$.12H$_2$O | 85/15 | 9.5 | Yes |
| 4 | Ca(OCl)$_2$/MgSO$_4$.7H$_2$O | 90/10 | 6.0 | Yes |
| 5 | Ca(OCl)$_2$/MgSO$_4$.7H$_2$O | 75/25 | 13.5 | Yes |
| 6 | Ca(OCl)$_2$/MgSO$_4$.7H$_2$O | 70/30 | 16.0 | Yes |
| Blends with "hydrated" Ca(OCl)$_2$ | | | | |
| 7 | Ca(OCl)$_2$.2H$_2$O/CaSO$_4$.2H$_2$O | 80/20 | 9.0 | Yes |
| 8 | Ca(OCl)$_2$.2H$_2$O/Na$_2$B$_4$O$_7$.5H$_2$O | 80/20 | 11.0 | Yes |
| 9 | Ca(OCl)$_2$.2H$_2$O/Na$_3$PO$_4$.12H$_2$O | 85/15 | 13.8 | Yes |
| 10 | Ca(OCl)$_2$.2H$_2$O/MgSO$_4$.7H$_2$O | 90/10 | 10.5 | Yes |
| 11 | Ca(OCl)$_2$.2H$_2$O/MgSO$_4$.7H$_2$O | 75/25 | 17.3 | No |
| 12 | Ca(OCl)$_2$.2H$_2$O/MgSO$_4$.7H$_2$O | 70/30 | 20.5 | No |

Note that the tests were run both with anhydrous (less than 1% water) and hydrated (6% water) calcium hypochlorite, although it should be noted that hydrated calcium hypochlorite did not exist on a commercial basis when the earlier Pennwalt work was done.

The tests show that the first four blends in the table (Examples 1—4), while they are within the scope of the Pennwalt patent, do not pass the UN Division 5.1 Oxidizer test. All are classified as oxidizers by that test.

The only blends that pass the UN Division 5.1 Oxidizer (i.e., are not oxidizers) are the 75/25 and 70/30 hydrated cal hypo/MgSO$_4$·7H$_2$O blends (Examples 11 and 12). Note that neither the 75/25 nor the 70/30 anhydrous calcium hypochlorite/MgSO$_4$·7H$_2$O blends (Examples 5 and 6) pass the UN Division 5.1 Oxidizer test. Both the 75/25 and 70/30 hydrated cal hypo/MgSO$_4$·7H$_2$O blends are outside of the scope of the Pennwalt patent for at least two reasons. First, as stated earlier, hydrated calcium hypochlorite did not exist commercially at that time, and, second, the products both contain substantially more than 13% water cited in the Pennwalt patent.

Further testing also showed that the 70/30 blend of hydrated calcium hypochlorite and magnesium sulfate heptahydrate did not accelerate the burning of the product in 5-lb. plastic bottles. The bottles containing the blends of Examples 11 and 12, when artificially set on fire using kerosene and a torch burned slowly, showing a burn rate similar to the empty plastic packages themselves. Conversely, calcium hypochlorite hydrate alone in the same quantity and packaging, burned quite vigorously.

Continuous Flow Tablet Dissolving Test

Six formulations noted below in Table 2 were prepared by first homogenously blending the listed ingredients together for each formulation and then preparing six batches of tablets of such blends that weighed 285 grams each. These tablets were produced on either Bipel or Hydratron hydraulic tabletting machine into a shape similar to the cylindrical tablets shown in U.S. Pat. No. 4,876,003 (Casberg et al.). The Bipel press was a 3-tablet, 70 ton Split Preformer Bipel Hydraulic Press. The batches made with it had dwell times between 2.4 and 3.0 seconds and the pressures were 2800–3100 psig. The Hydratron Press was a 30 ton, Single Tablet, Hydraton Hydraulic Press. The batches made with it were run at 0.6 second dwell and a pressure of 2100–2200 psig.

TABLE 2

Calcium Hypochlorite Hydrate/Magnesium Sulfate Heptahydrate/Lime Formulations

| Formulation | Ca(OCl)$_2$.2H$_2$O | MgSO$_4$.7H$_2$O | Ca(OH)$_2$ |
|---|---|---|---|
| 1 | 70 | 30 | 0 |
| 2 | 30 | 27 | 3 |
| 3 | 70 | 28.5 | 1.5 |
| 4 | 70 | 29 | 1 |
| C-5 | 98.5 | 0 | 1.5 |
| C-6* | 98.5 | 0 | 1.5 |

*Formulation had a plastic sleeve around the tablet as shown in U.S. Pat. No. 4,876,003.

These tablets of such formulation were then placed in separate skimmers in a swimming pool. The flow rate of water through the skimmers was 30 gallons per minute. The size basket of the skimmer was 6.5 inches. The test was run with the water flow on for 12 continuous hours and then off for 12 continuous hours for each day. During the off period, the tablets were submerged under water in the skimmer. These tablets were removed from the skimmers at periodic time intervals and weighed. The approximate average dissolving rates of each formulation over a 2 to 6-day test period are shown below in Table 3.

TABLE 3

| Formulation | Average Dissolving Rates (grams/day) |
|---|---|
| 1 | 137 |
| 2 | 73 |
| 3 | 94 |
| 4 | 73 |
| 5 | 790 |
| 6 | 118 |

Static Dissolving Tests

Four formulations noted below in Table 4 were prepared by first homogenously blending the listed ingredients together for each formulation and then preparing tablets of such blends. Each tablet weighed 285 grams. These tablets were produced on a hydraulic tabletting machine all from batches about 200 pounds each into a shape similar to the cylindrical tablets shown in U.S. Pat. No. 4,876,003 (Casberg et al.). These tablets were all produced on the 30 ton, Single Tablet, Hydratron Hydraulic Press. The pressing pressure for all batches was 2500 to 2800 psig with a 0.2 second dwell.

TABLE 4

| Formulation | $Ca(OCl)_2 \cdot 2H_2O$ | $MgSO_4 \cdot 7H_2O$ | $Ca(OH)_2$ |
|---|---|---|---|
| 1 | 98.5% | — | 1.5% |
| 2 | 70% | 30% | — |
| 3 | 70% | 28.5% | 1.5% |
| 4 | 70% | 27% | 3% |

Each pre-weighted tablet was placed in a basket in 3 liters of water. There was no stirring of the water for 5½ hours. The tablet was removed and re-weighed, then the water was mixed vigorously for 30 minutes before being analyzed for $Cl_2$ content. The water was allowed to settle and the tablets were placed back in their baskets until next time for measurement. The mixing and analyzing procedures were repeated. The results of these measurements are shown in Table 5 below.

Available Chlorine Loss With and Without Lime

Five types of 20 gram samples were placed in sealed glass vials and were heated for either 10 or 20 days in a Fisher Isotemp 200 Series Model 230G oven that was preheated at 45° C.

These five types of samples were as follows:
(1) Control—Standard hydrated calcium hypochlorite granules (commercially available from Arch Chemicals as HtH® Poolife® Active Cleaning hydrated calcium hypochlorite granules).
(2) Regranulated Duration brand hydrated calcium hypochlorite tablets having no lime included therein. Duration tablets are available from Arch Chemicals, Inc. Regranulation of these tables was effected manually by use of a mortar and pestle.
(3) Regranulated Duration brand hydrated calcium hypochlorite tables having 1.5% by weight lime ($Ca(OH)_2$) incorporated therein. Duration tablets are available from Arch Chemicals, Inc. Regranulation of these tablets was effected manually by use of a mortar and pestle.
(4) Regranulated hydrated calcium hypochlorite tablets that contained 70% by weight hydrated calcium hypochlorite and 30% by weight magnesium sulfate heptahydrate. Regranulation of these tables was effected manually by use of a mortar and pestle.
(5) Regranulated hydrated calcium hypochlorite tables that contained 70% by weight hydrated calcium hypochlorite,

TABLE 5

Treated Water Used

| Formulation | Time Hours | Weight g. | Weight Loss | Temp. ° C. | % AvC12 in solution | g C12 in solution (by analysis) | Dosage into pool per Capsule, ppm avcl | Dosage per Capsule per day, ppm avcl |
|---|---|---|---|---|---|---|---|---|
| #1 | 0 | 296.96 | 0.00 | 20.0 | 0.00 | 0.00 | | |
| | 5.5 | 225.11 | 71.85 | 20.0 | 2.15 | 64.50 | 1.1 | 4.9 |
| | 24 | 147.24 | 149.72 | 20.0 | 3.69 | 110.80 | 1.9 | 1.9 |
| | 48 | 64.07 | 232.89 | 20.0 | 4.79 | 144.00 | 2.5 | 1.3 |
| | 72 | 28.80 | 268.16 | 20.0 | 4.89 | 147.00 | 2.6 | 0.9 |
| #2 | 0 | 280.52 | 0.00 | 20.0 | 0.00 | 0.00 | | |
| | 5.5 | 260.03 | 20.49 | 20.0 | 0.88 | 26.50 | 0.5 | 2.0 |
| | 24 | 241.93 | 38.59 | 20.0 | 1.48 | 44.33 | 0.8 | 0.8 |
| | 48 | 102.67 | 177.85 | 20.0 | 1.69 | 50.70 | 0.9 | 0.4 |
| | 72 | 0.00 | 280.52 | 20.0 | 2.06 | 61.75 | 1.1 | 0.4 |
| #3 | 0 | 298.76 | 0.00 | 20.0 | 0.00 | 0.00 | | |
| | 5.5 | 304.98 | 0.00 | 20.0 | 0.64 | 19.10 | 0.3 | 1.5 |
| | 24 | 288.78 | 9.98 | 20.0 | 1.20 | 35.98 | 0.6 | 0.6 |
| | 48 | 176.08 | 122.68 | 20.0 | 1.77 | 53.20 | 0.9 | 0.5 |
| | 72 | 69.00 | 229.76 | 20.0 | 2.48 | 74.40 | 1.3 | 0.4 |
| #4 | 0 | 278.74 | 0.00 | 20.0 | 0.00 | 0.00 | | |
| | 5.5 | 279.47 | 0.00 | 20.0 | 0.7 | 21.00 | 0.4 | 1.6 |
| | 24 | 249.58 | 29.16 | 20.0 | 1.28 | 38.37 | 0.7 | 0.7 |
| | 48 | 130.63 | 148.11 | 20.0 | 2.00 | 58.89 | 1.1 | 0.5 |
| | 72 | 62.00 | 216.74 | 20.0 | 2.37 | 71.00 | 1.2 | 0.4 |

The average dissolving rate of each tablet is shown below:

| Formulation | Average Dissolving Rate |
|---|---|
| 1 | 119 |
| 2 | 74 |
| 3 | 49 |
| 4 | 58 |

29% by weight magnesium sulfate heptahydrate and 1% by weight lime ($Ca(OH)_2$) incorporated therein. Regranulation was effected manually by a mortar and pestle.

The available chlorine in the sample was measured before and after each run. This available chlorine analysis was conducted by titration with standardized sodium thiosulfate to a starch iodide endpoint. These 10 or 20 day oven tests simulate the loss of available chorine in packaged products under either 1 year or 2 years of normal storage conditions.

The amount of loss of available chorine for each sample run during the 20 day oven test are shown in Table 6.

The amount of loss of available chlorine for each sample run during the 10 day oven test are shown in Table 7.

TABLE 6

Loss of Available Chlorine
Total summary for 20 Days in Oven - 2 year Field Simulation

|  | Granular | Duration | Duration | Calhypo/ Mg(SO$_4$)$_2$.7H$_2$O | |
| --- | --- | --- | --- | --- | --- |
|  | Cal Hypo Alone | Tablets No Lime | Tablets 1.5% Lime | No Lime | 1.0% Lime |
| Run #1 | 8.46 | 9.99 | 10.40 | 24.87 | 13.96 |
| Run #2 | 9.29 | 10.81 | 10.11 | 18.24 | 9.56 |
| Run #3 | 8.14 | 10.66 | 9.04 | 22.48 | 12.26 |
| Run #4 | 6.60 | | | 22.27 | 13.06 |
| Run #5 | 9.80 | | | 36.37 | 15.12 |
| Run #6 | 10.77 | | | 21.88 | 8.28 |
| Run #7 | 7.52 | | | 29.19 | 14.59 |
| Run #8 | 8.27 | | | 22.87 | 17.45 |
| Run #9 | 9.29 | | | 20.64 | 11.61 |
| Run #10 | 9.55 | | | 25.24 | 12.65 |
| Averages | 8.77 | 10.49 | 9.85 | 24.40 | 12.85 |
| Std Dev | 1.21 | 0.44 | 0.72 | 5.12 | 2.67 |

TABLE 7

Loss of Available Chlorine
Total summary for 10 Days in Oven - 1 year Field Simulation

|  | Granular | Duration | Duration | Calhypo/ Mg(SO$_4$)$_2$.7H$_2$O | |
| --- | --- | --- | --- | --- | --- |
|  | Cal Hypo Alone | Tablets No Lime | Tablets 1.5% Lime | No Lime | 1.0% Lime |
| Run #1 | 2.95 | 4.14 | 4.21 | 3.52 | 2.06 |
| Run #2 | 3.09 | 4.50 | 4.47 | 3.86 | 2.57 |
| Run #3 | 3.61 | 4.74 | 4.10 | 2.52 | 2.57 |
| Run #4 | 3.37 | | | 13.07 | 2.26 |
| Run #5 | 4.97 | | | 25.8 | 3.84 |
| Run #6 | 3.95 | | | 3.33 | 2.56 |
| Run #7 | 4.01 | | | 18.35 | 3.49 |
| Run #8 | 3.24 | | | 2.27 | 3.03 |
| Run #9 | 2.79 | | | 1.58 | 1.22 |
| Run #10 | 4.00 | | | 3.39 | 4.23 |
| Averages | 3.60 | 4.46 | 4.26 | 7.77 | 2.78 |
| Std Dev | 0.65 | 0.30 | 0.19 | 8.39 | 0.89 |

These results indicate that the addition of lime to the hydrated calcium hypochlorite/magnesium sulfate heptahydrate blended product of the present invention clearly increases its available chlorine stability, resulting in longer shelf life.

While the invention has been described above with reference to specific embodiments thereof, it is apparent that many changes, modifications, and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A non-Division 5.1 Oxidizer tablet consisting essentially of a blend of hydrated calcium hypochlorite with magnesium sulfate heptahydrate, wherein the blend contains at least about 17% by weight of water based on the total weight of the blend; contains from about 0.1% to about 10% of lime based on the total weight of the hydrated calcium hypochlorate and magnesium sulfate heptahydrate and the average dissolving rate of the tablet is less than 150 grams per day.

2. The tablet of claim 1 wherein the composition contains at least 25% by weight of magnesium sulfate heptahydrate and less than about 75% by weight of hydrated calcium hypochlorite.

3. The tablet of claim 1 wherein the composition contains about 25% to about 40% by weight of magnesium sulfate heptahydrate and about 60% to about 75% of hydrated calcium hypochlorite.

4. The tablet of claim 1 wherein the amount of water in the composition is from about 18% to about 24% by weight of the composition.

5. The tablet of claim 1 wherein the tablet contains from about 0.5% to about 3% by weight of lime, said percentage based on the combined weight of the hydrated calcium hypochlorite and magnesium sulfate heptahydrate.

6. The tablet of claim 1 wherein the tablet contains about 1% to about 2% by weight of lime, said percentage based on the combined weight of the hydrated weight of the hydrated calcium hypochlorite and magnesium sulfate heptahydrate.

7. The tablet of claim 1 wherein the average dissolving rate is less than about 100 grams per day.

8. A non-Division 5.1 Oxidizer tablet consisting of a blend of hydrated calcium hypochlorite with magnesium sulfate heptahydrate, wherein the blend contains at least 17% by weight of water based on the total weight of the blend; contains from about 0.1 to about 10% of lime based on the total weight of the hydrated calcium hypochlorate and magnesium sulfate heptahydrate and the average dissolving rate of the blend is less than 150 grams per day.

9. The tablet of claim 8 wherein the composition contains at least 25% by weight of magnesium sulfate heptahydrate and less than about 75% by weight of hydrated calcium hypochlorite.

10. The tablet of claim 9 wherein the composition contains about 25% to about 40% by weight of magnesium sulfate heptahydrate and about 60% to about 75% of hydrated calcium hypochlorite.

11. The tablet of claim 10 wherein the amount of water in the composition is about 18% to about 24% by weight of the composition.

12. The tablet of claim 11 wherein the average dissolving rate is less than 100 grams per day.

13. The tablet of claim 12 wherein the tablet contains from about 0.5% to about 3% by weight of lime, said percentage based on the combined weight of the hydrated calcium hypochlorite and magnesium sulfate heptahydrate.

14. The tablet of claim 12 wherein the tablet contains about 1% to about 2% by weight of lime, said percentage based on the combined weight of the hydrated weight of the hydrated calcium hypochlorite and magnesium sulfate heptahydrate.

* * * * *